United States Patent [19]

Schork et al.

[11] Patent Number: 4,923,687
[45] Date of Patent: May 8, 1990

[54] METHOD FOR REMOVING SILANE COMPOUNDS FROM SILANE-CONTAINING EXHAUST GASES

[75] Inventors: Reinhold Schork; Reinhard Matthes, both of Rheinfelden; Hans-Joachim Vahlensieck, Wehr, all of Fed. Rep. of Germany

[73] Assignee: Huels Aktiengesellschaft, Mar I, Fed. Rep. of Germany

[21] Appl. No.: 395,352

[22] Filed: Aug. 17, 1989

[30] Foreign Application Priority Data

Aug. 23, 1988 [DE] Fed. Rep. of Germany ....... 3828549

[51] Int. Cl.$^5$ .......................... C01B 7/00; B01D 8/00; B01D 47/00
[52] U.S. Cl. ............................ 423/210; 423/240; 423/245.1; 423/245.2; 556/470; 556/471
[58] Field of Search ................. 423/240, 245.1, 245.2, 423/210; 556/470, 471

[56] References Cited

U.S. PATENT DOCUMENTS 4,313,916  2/1982  Jones et al. .................. 423/240
4,631,183  12/1986  Lalancette et al. ............ 423/210
4,784,837  11/1988  Kitayama et al. ............. 423/240

FOREIGN PATENT DOCUMENTS 1185593  1/1965  Fed. Rep. of Germany ...... 423/240
3247997  6/1984  Japan ............................. 423/240
262843   5/1970  U.S.S.R. ......................... 423/240

Primary Examiner—Gary P. Straub
Assistant Examiner—Lori F. Cuomo
Attorney, Agent, or Firm—Felfe & Lynch

[57] ABSTRACT

A method for removing silane compounds from exhaust gases containing silanes comprises treating the silane containing gas with a metal alcholate in alcoholic solution to form a tetraalkoxysilane.

5 Claims, 1 Drawing Sheet

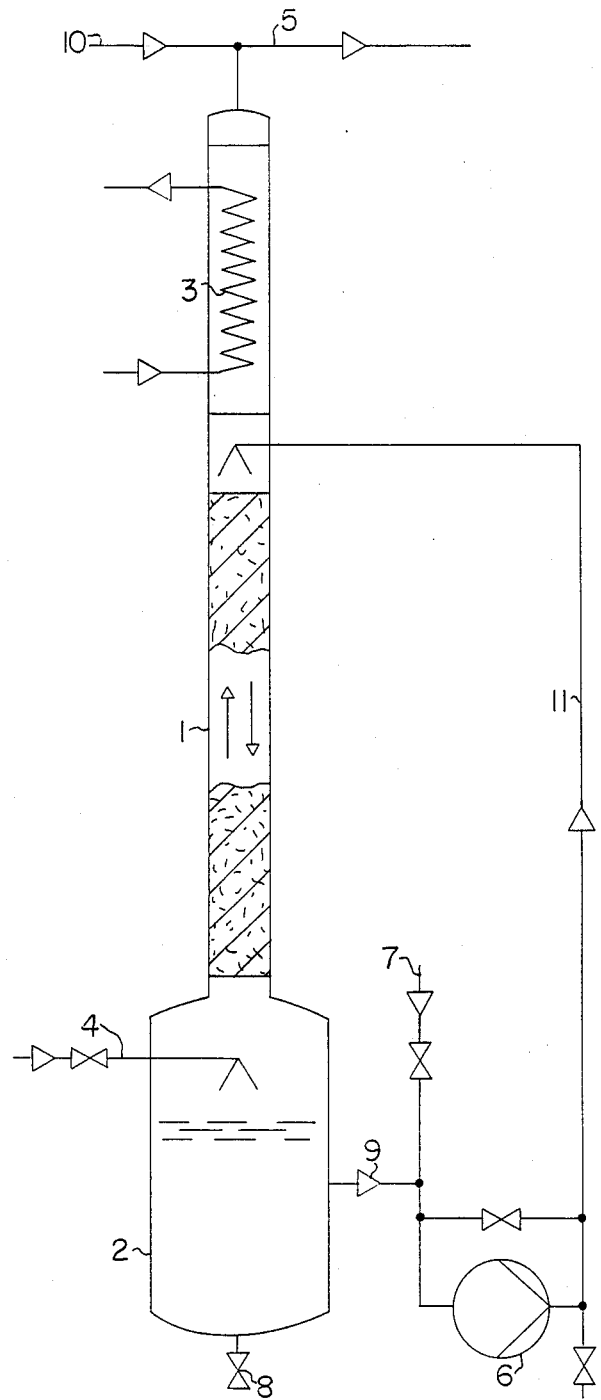

METHOD FOR REMOVING SILANE COMPOUNDS FROM SILANE-CONTAINING EXHAUST GASES

FIELD OF THE INVENTION

This invention relates to a novel method for removing silane compounds from silane-containing exhaust gases.

BACKGROUND OF THE INVENTION

Exhaust gases which contain silane and must be subjected to cleaning are being produced today in many branches of industry, as for example in the production of silicon compounds, in the packing of silicon compounds, in the production and bottling of silane-containing gas mixtures, and in the production of semiconductors.

Conventional methods of disposal, such as burning or washing in wash towers, present great problems with regard to their technical practice and the pollution of the environment. Burning them off causes the development of very fine silica which are hard to separate from the combustion gases. If chlorosilanes are contained in the exhaust, HCl and $Cl_2$ occur in the combustion gases, i.e., the burning must be followed by an additional exhaust treatment. If aqueous wash tower systems are used, problems occur due to silification, and in the case of chlorosilanes acid waste water problems are encountered. Monosilane is but slowly hydrolyzed by water, so that an alkaline washing must be added afterwards.

OBJECT OF THE INVENTION

It is an object of the present invention to provide a method for the removal of silane compounds from silane-containing exhaust gases which does not have the aforementioned disadvantages. Other objects and advantages of the invention will become apparent a the description thereof proceeds.

DESCRIPTION OF THE INVENTION

The above object is achieved in accordance with the instant invention by reacting the silane compounds with a metal alcoholate solution to produce a tetraalkoxysilane.

In the process of the invention the silane compounds are completely converted into tetraalkoxysilane. The tetraalkoxysilane can be worked up by alkoxysilane manufacturers and marketed.

In practice, the alcoholic metal alcoholate solution is advantageously circulated through a packed column.

The method of the invention can be performed in countercurrent or in parallel flow. Preferably, the silane-containing exhaust gases are conducted countercurrently with respect to the metal alcoholate solution.

Preferably sodium methylate in methanol or sodium ethylate in ethanol is used as the metal alcoholate reactant in the method of the invention. The concentration of the metal alcoholate in the alcohol is preferably 5 to 30 wt.-%.

By means of the method of the invention the following silane compounds can be removed from exhaust gases:

$SiH_nX_{4-n}$; n=0–4, F, Cl, Br;
$SiH_n(OR)_{4-n}$; n=1–3, R=$CH_3$, $C_2H_5$, $C_3H_7$;
$Si_2H_6$ and higher silanes, such as trisilane.

Preferably, the process is used in conjunction with exhaust gases containing monosilane and disilane. In the removal of silanes the reaction proceeds, for example, in accordance with the equation:

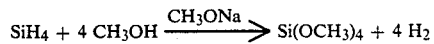

The use of sodium methylate in methanol is especially cost effective.

If the exhaust gas contains only Si-H compounds, the reaction products obtained are only tetraalkoxysilane and hydrogen. Only the alcohol is consumed; the alcoholate has only a catalytic action. Thus, only the used-up alcohol and the alcoholate that escapes with the tetraalkoxysilane has to be replaced in the circulating solution.

The reaction of the alkoxysilanes of the above-mentioned general formula with the alcohol follows a course under the catalytic action of the metal alcoholate which is similar to the reaction of the silanes according to the above equation, with the formation of tetraalkoxysilane and hydrogen.

The halogenated silanes that occur in silane-containing exhaust gases are usually tetrachlorosilane, trichlorosilane, dichlorosilane and monochlorosilane. The reaction for the removal of these silanes takes place, for example, according to the equation:

$SiH_2Cl_2 + 2\ NaOCH_3 + 2\ CH_3OH \rightarrow Si(OCH_3)_4 + 2\ H_2 + 2\ NaCl.$ Halogenated silanes yield a metal halide as an additional reaction product. In this case, alcoholate is consumed in addition to the alcohol, corresponding to the chlorine content of the silane.

BRIEF DESCRIPTION OF THE DRAWING

The schematic representation in the accompanying drawing of an apparatus for the performance of the novel method will, together with the examples, serve to further illustrate the invention.

Referring now to the drawing, the alcoholic metal alcoholate solution is delivered through feed line 7 and pump 6 to the packed column 1. The silane-containing exhaust gas is introduced, for example, through line 4. In this embodiment, therefore, the silane-containing exhaust gas flows countercurrently to the alcoholate solution. The cleaned gas leaves the column through the exhaust gas cooler 3 and the exhaust gas line 5. A coolant with a temperature of, for example, −40° C. flows through the exhaust gas cooler. The system is blanketed with an inert gas, for example nitrogen, through line 10. In the exhaust gas cooler 3 any solvents and/or alkoxysilane entrained by the inert gas are condensed. The alcoholic metal alcoholate solution is collected in tank 2, which also serves as a settling tank for NaCl in the treatment of chlorosilane-containing exhaust gases and as a collector for the condensate from the exhaust gas cooler The alcoholic metal alcoholate solution is circulated through outlet 9, pump 6 and line 11. Depending on the silane compounds present in the exhaust gas, the alcohol or the alcoholate solution that is consumed is replaced. The spent alcoholate solution, the sodium chloride that has formed, and other liquid or solid components that are formed by reaction or condensation are drained off through draincock 8.

The reactions in the following Examples 1 to 3 were performed at a pressure of about 1 bar and at room temperature. It is also possible, however, to perform the process of the invention at other pressures and temperatures.

The following examples illustrate the present invention and will enable others skilled in the art to understand it more completely. It should be understood, however, that the invention is not limited solely to the particular examples given below.

EXAMPLE 1

The entire apparatus was first flushed out with nitrogen. A 20 to 30 weight-percent methanolic sodium methylate solution was then fed in through inlet 7. After starting up pump 6 and exhaust cooler 3, an exhaust gas containing chlorosilane was introduced through line 4. Phenolphthalein was added as an indicator to the methylate solution. Incipient decoloration in the packed column 1 indicated that the sodium methylate solution was exhausted. Part of the spent solution was then let out through draincock 8 together with the precipitated sodium chloride. The liquid supply to pump 6 was assured through outlet 9. The corresponding amount of fresh solution was added through inlet 7. It was not necessary to shut down the apparatus to do this. Gas-chromatographic analysis of the gas leaving exhaust line 5 showed that it contained no chlorosilane. The apparatus was constantly operated in an atmosphere of nitrogen.

EXAMPLE 2

The entire apparatus was first flushed out with nitrogen. Commercial 5 to 30 wt-% methanolic sodium methylate solution was fed in through inlet 7. After pump 6 and gas cooler 3 had been started up, exhaust gas containing monosilane was introduced through line 4. When the alcoholate solution was used up, a part of the spent solution was let out, as in Example 1, and fresh solution was added. Again, the apparatus did not need to be shut down. Gas-chromatographic analysis of the gas leaving exhaust line 5 showed that it contained no monosilane.

The apparatus was constantly operated in an atmosphere of nitrogen.

EXAMPLE 3

First the entire apparatus was flushed out with nitrogen. Through inlet 7, commercial 5 to 30 wt-% ethanolic sodium ethylate solution was fed in. After starting pump 6 and exhaust cooler 3, exhaust gas containing monosilane was introduced through line 4. When the alcoholate solution was used up, part of the old solution was let out as in Example 1, and fresh solution was added. Again, the apparatus did not need to be shut down. Gas-chromatographic analysis of the gas leaving exhaust line 5 showed that it contained no monosilane.

The apparatus was constantly operated in an atmosphere of nitrogen.

EXAMPLE 4 (For comparison)

600 ml of a saturated solution of KOH in methanol were introduced into a one-liter three-necked flask equipped with a gas introduction tube, stirrer and reflux condenser. A nitrogen stream containing trichlorosilane was passed through the solution, while stirring. Immediately, a white solid formed, with frothing. The chlorosilane reacted completely, but the greasy consistency of the suspension which formed would interfere with continuous operation of the apparatus as described in Examples 1 to 3 in a reliable and reproducible manner. Furthermore, difficulties were encountered in getting the product into a form suitable for disposal.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. The method of removing silane compounds from silane-containing exhaust gases, which comprises reacting said exhaust gases with a metal alcoholate in an alcoholic solution to form tetraalkoxysilane.

2. The method of claim 1, wherein the alcoholic metal alcoholate solution is circulated through a packed column.

3. The method of claim 1, wherein the silane-containing exhaust gases are conducted countercurrently to the metal alcoholate solution.

4. The method of claim 1, wherein said alcoholic solution is sodium methylate in methanol or sodium ethylate in ethanol.

5. The method of claim 1, wherein the concentration of the metal alcoholate in the alcohol is 5 to 30 weight-percent.

* * * * *

UNITED STATES PATENT AND TRADEMARK OFFICE
CERTIFICATE OF CORRECTION

PATENT NO. : 4,923,687
DATED : May 8, 1990
INVENTOR(S) : Reinhold Schork et al

It is certified that error appears in the above-identified patent and that said Letters Patent is hereby corrected as shown below:

Column 1, line 40, "a" should read --as--.

Column 1, line 66, before "F" insert --X =--.

Column 2, line 61, after "cooler" insert --3.--

Signed and Sealed this

Third Day of March, 1992

Attest:

HARRY F. MANBECK, JR.

*Attesting Officer*  *Commissioner of Patents and Trademarks*